(12) United States Patent
Emmert

(10) Patent No.: US 9,045,645 B2
(45) Date of Patent: Jun. 2, 2015

(54) INORGANIC OXIDE POWDER

(75) Inventor: Jake Emmert, Portage, IN (US)

(73) Assignee: Cathay Pigments USA, Inc., Valparaiso, IN (US)

( * ) Notice: Subject to any disclaimer, the term of this patent is extended or adjusted under 35 U.S.C. 154(b) by 698 days.

(21) Appl. No.: 13/166,042

(22) Filed: Jun. 22, 2011

(65) Prior Publication Data

US 2012/0031801 A1 Feb. 9, 2012

Related U.S. Application Data

(60) Provisional application No. 61/370,986, filed on Aug. 5, 2010.

(51) Int. Cl.
| | | |
|---|---|---|
| C09C 1/24 | (2006.01) | |
| C09C 1/62 | (2006.01) | |
| C09C 1/40 | (2006.01) | |
| C04B 14/30 | (2006.01) | |
| C04B 20/10 | (2006.01) | |
| C09C 1/00 | (2006.01) | |
| C04B 103/54 | (2006.01) | |

(52) U.S. Cl.
CPC .............. C09C 1/24 (2013.01); *B65D 2213/00* (2013.01); C04B 14/308 (2013.01); C04B 20/1066 (2013.01); *C04B 2103/54* (2013.01); *C09C 1/0081* (2013.01)

(58) Field of Classification Search
CPC .............. C09C 1/24; C09C 1/40; C09C 1/62; C09C 1/245
USPC .......................................... 428/403; 106/400
See application file for complete search history.

(56) References Cited

U.S. PATENT DOCUMENTS

| | | | |
|---|---|---|---|
| 4,491,619 A | 1/1985 | Biermann | |
| 5,626,962 A * | 5/1997 | Yamasaki et al. | 428/403 |
| 6,179,907 B1 | 1/2001 | Kwan | |
| 6,596,070 B1 * | 7/2003 | Schmidt et al. | 106/417 |
| 7,479,323 B2 * | 1/2009 | Rathschlag et al. | 428/403 |
| 2003/0203207 A1 | 10/2003 | Pessey | |
| 2004/0177788 A1 * | 9/2004 | Rick et al. | 106/415 |

FOREIGN PATENT DOCUMENTS

| | | | | |
|---|---|---|---|---|
| WO | WO-2011/016143 | * | 2/2011 | C09C 3/08 |
| WO | WO 2011/016143 | * | 2/2011 | C09C 1/02 |

* cited by examiner

*Primary Examiner* — Pegah Parvini
(74) *Attorney, Agent, or Firm* — Daniel Zamudio

(57) ABSTRACT

A chemical compound of Black Iron Oxide particles coated with aluminum oxide particles and magnesium sulfate particles. The coated compound is protected from contact with the oxygen molecules in the surrounding atmosphere and thereby is less prone to self-heating and combustion.

2 Claims, 4 Drawing Sheets

INORGANIC OXIDE POWDER

CROSS-REFERENCE TO RELATED APPLICATIONS

This application claims the benefit of U.S. Provisional Application No. 61/370,986, filed Aug. 5, 2010.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND

The natural world around us abounds in colors. Manmade things, too, are full of colors. Manufacturers of these manmade things use pigments in the manufacturing process to add colors. Pigments are powders that, when mixed with a liquid, make a paint or ink. Black iron oxide is an inorganic pigment that is used extensively in many industries, such as the coating, asphalt, construction, food, cosmetics, data recording and plastics industries. Black iron oxide is shipped to manufacturers all across the country in large quantities, often in the thousands of pounds.

Black iron oxide contains iron molecules in a +2 oxidation state. The iron in such an oxidation state is thermodynamically unstable and will oxidize when exposed to an oxidizing environment, such as air. When oxidized, black iron oxide turns reddish brown, what many people recognize as a rust color, and is expressed by the chemical equation $4Fe_3O_4+O_2 \rightarrow 6Fe_2O_3+Heat$.

It is well known in the pigments industry that oxidation of black iron oxide is an exothermic reaction and liberates heat, a process known as self-heating. During self-heating, spontaneous combustion of black iron oxide is common.

The United States Department of Transportation and the United Nations use a particular testing procedure to classify self-heating substances for transport identification purposes. In the test, a dry sample of a substance to be tested is placed in a sample container. The sample container containing the dry sample is then placed in an oven and subjected to an oven temperature of approximately 140 degrees celcius. The dry sample temperature is monitored continuously over a 24 hour period by use of a thermocouple placed at the center of the dry sample and another thermocouple placed between the sample container and the oven wall. Monitoring thus, provides a measure of the temperature rise, if any, of the dry sample relative to the oven temperature. An approximate 60 degree celcius rise in the dry sample temperature as compared to the oven temperature indicates problematic self-heating that can cause spontaneous combustion of the dry sample, such as a sample of black iron oxide.

The problem of black iron oxides tending toward spontaneous combustion is complicated when the pigment is packaged in large quantities, particularly during storage and transportation. To prevent such spontaneous combustion of black iron oxide, it has become necessary to package the pigment in small quantities using many small containers, such as thick paper sacks to name one example, to accommodate large orders. Such packaging requires that a United Nations certificate be affixed thereto in order to comply with transport regulations. Because such packaging increases the cost of shipping, a better solution to prevent spontaneous combustion of black iron oxide is needed.

Attempts have been made at coating the black iron oxide sufficiently enough to shield the black iron oxide from an oxidizing environment, such as air, and thereby minimize self-heating. Information relevant to attempts to address these problems can be found in U.S. Pat. Nos. 4,382,982, 4,491,619, 5,039,553, 5,188,898, 5,449,565, 5,650,194, 5,714,299, 6,179,907 and 3,869,298. However, each one of these references suffers minimally from one or more of the following disadvantages: 1) use of Boron as a coating, 2) use of silicates as a coating and 3) use of non-aluminum coating.

For the foregoing reasons there is a need in the industry for a simple means to coat black iron oxide sufficiently enough to shield the black iron oxide from an oxidizing environment and thereby improve the heat stability of black iron oxide. Such a solution to the problems described would eliminate the need for the use of United Nations certification and facilitate the storage and transportation to manufacturers of large quantities of black iron oxide pigments for coloring the manmade things that humans use.

SUMMARY

One embodiment of the present invention is directed to a chemical compound and method for making that chemical compound that satisfies this need. The chemical compound comprises an inorganic oxide powder, at least made up from a plurality of iron oxide particles and a plurality of aluminum oxide particles and a plurality of magnesium sulfate particles. The aluminum oxide particles mix with the magnesium sulfate particles and form a coat of comprising those particles. The coating sufficiently surrounds the iron oxide particles such that contact between the iron oxide particles and an oxidizing environment is reduced. The inventor has discovered an embodiment containing about 99.3% iron oxide particles, 0.67% aluminum oxide particles, and about 0.2% magnesium sulfate particles works sufficiently well to solve the problem of heat stability.

Another example of the present invention is a containment system to contain an inorganic oxide powder for use as a pigment, comprising a plurality of iron oxide particles, a plurality of aluminum oxide particles, a plurality of magnesium sulfate particles, the aluminum oxide particles mixing with the magnesium sulfate particles thereby forming a coating surrounding the iron oxide particles thereby reducing contact between the iron oxide particles and an oxidizing environment, a container containing no more than about 450 liters of the inorganic oxide powder and being sealed and easily transportable.

One example of a method for making an embodiment of the inventive chemical compound comprises obtaining and measuring an amount of black iron oxide pigment particles and, in a container, mixing the particles with water to create a slurry. Heating the slurry to at least about 50 degrees celcius. Measuring the slurry's pH and, if necessary, adjusting the pH of the slurry to about 6.5 using sufficient amounts of any acid, such as hydrochloric acid or sulfuric acid. Creating a first mixture by adding an aluminum salt solution comprising aluminum in an amount of between about 0.1% and about 2% of the iron oxide pigment particles by weight. Placing the first mixture under constantly changing physical conditions, such as agitation, until mixed. Measuring the first mixture's pH and adjusting the pH of the first mixture to approximately 8.4 by adding any acid neutralizer, such as ammonia or an alkali metal hydroxide, thereby creating a second mixture. Placing the second mixture under constantly changing physical conditions, such as agitation, until mixed, measuring the second mixture's pH and adding, as needed, sufficient quantities of base to maintain the second mixture's pH at or above 8.0. Creating a third mixture by adding magnesium sulfate to the second mixture and placing the third mixture under constantly changing physical conditions, such as agitation, until mixed. Filtering the third mixture and washing it with water until its conductivity is less than about 500 micro-siemens. Drying at a temperature between about 45 degrees celcius and about 175 degrees celcius to produce an aluminum coated iron oxide powder for use as a pigment. The mixing in the above steps can be done for various amounts of time as determined by the mixer.

BRIEF DESCRIPTION OF THE SEVERAL VIEWS OF THE DRAWING

These and other features, aspects and advantages of the present invention will become better understood with regard to the following description, appended claims, and accompanying drawings where:

DETAILED DESCRIPTION OF THE INVENTION

Figure 1:
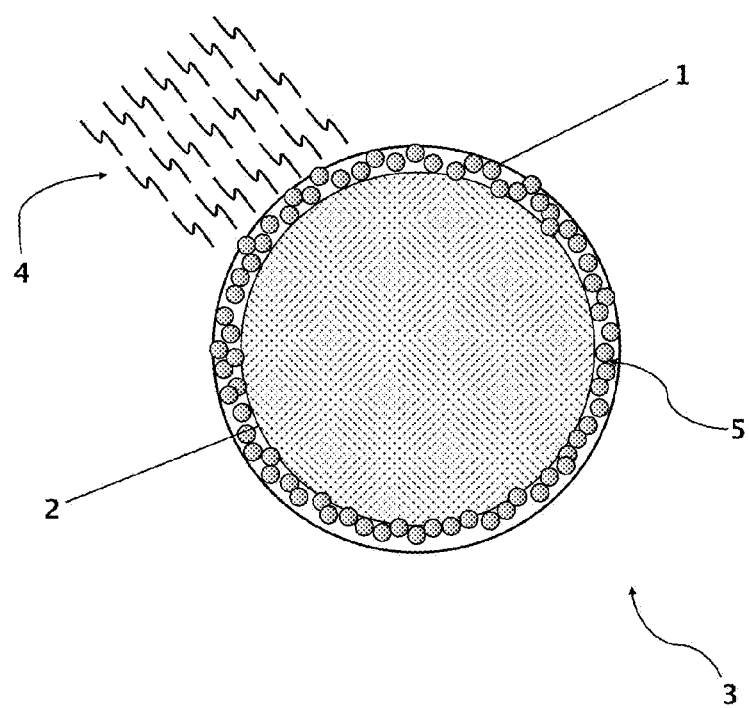
FIG. 1 shows a first embodiment according to the present invention, illustrating a powder mixture with low hazard of spontaneous combustibility.

A first embodiment of the invention is shown in FIG. 1 wherein FIG. 1 is view of a first embodiment according to the present invention, illustrating a powder mixture with low hazard of spontaneous combustibility.

As shown in FIG. 1 generally, a powder mixture with low hazard of spontaneous combustibility 3 has a metal oxide substance 2 that is surrounded by an aluminum substance 1 containing a plurality of aluminum molecules 5. The oxide substance 2 is prevented from contacting air 4 by the surrounding aluminum substance 1.

Figure 2:
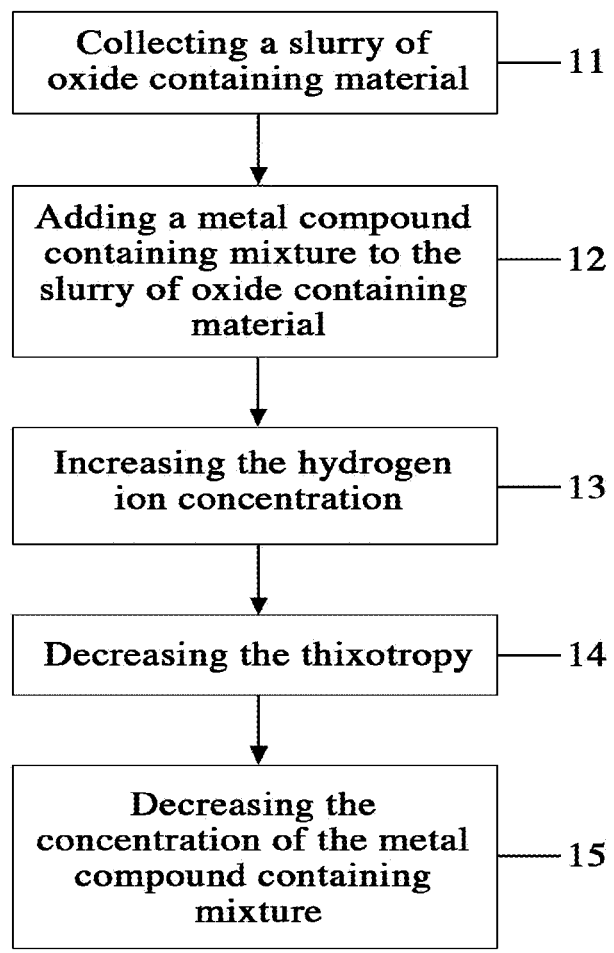
FIG. 2 shows a method embodiment according to the present invention, illustrating a process for making a powder mixture with low hazard of spontaneous combustibility.

A method embodiment of the invention is shown in FIG. 2 wherein FIG. 2 is a method embodiment according to the present invention, illustrating a process for making a powder mixture with low hazard of spontaneous combustibility.

As shown in FIG. 2 generally, an inventive method embodiment for making a powder mixture with low hazard of spontaneous combustibility shows the steps of obtaining an oxide slurry 11, adding a metal containing compound to the slurry 12, increasing the hydrogen ion concentration of the mixture 13, decreasing the thixotropy of the mixture 14, and decreasing the quantity of metal containing compound in the mixture 15.

Figure 3:
FIG. 3 depicts a surface of a powder mixture according to an embodiment of the invention as seen through a scanning electron microscope.
Figure 4:
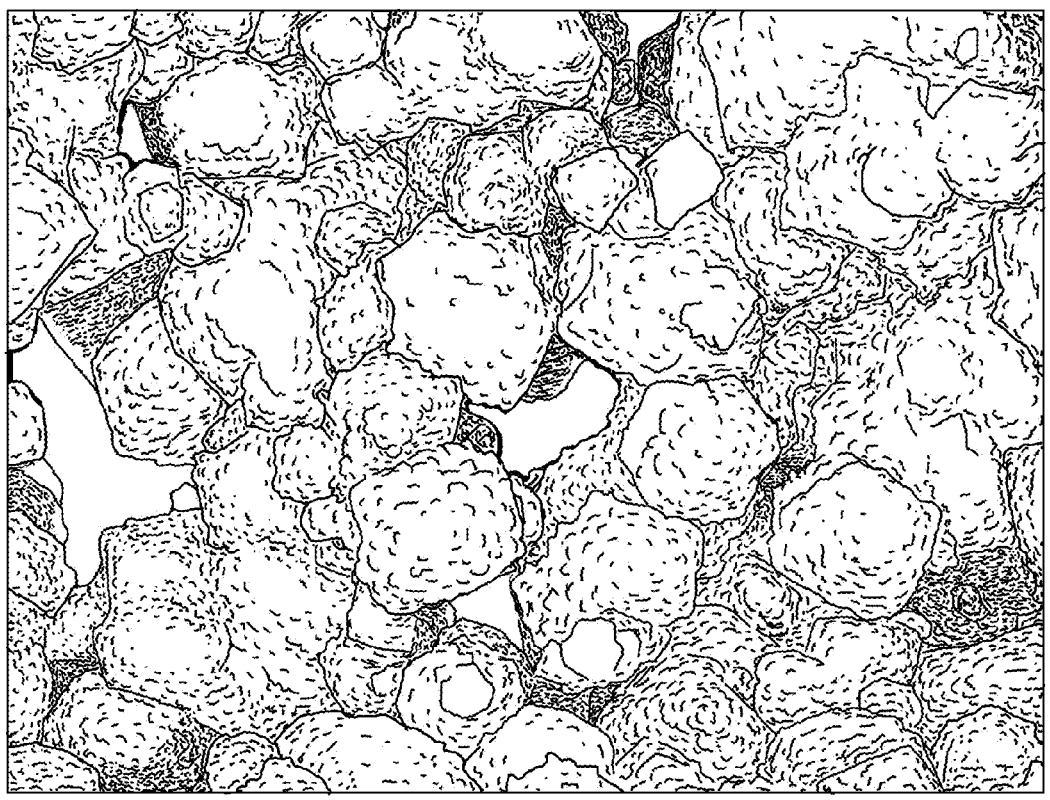
FIG. 4 depicts a surface of uncoated Black Iron Oxide as seen through a scanning electron microscope.

An embodiment of the inventive Black Iron Oxide has, as is illustrated in the photograph of FIG. 4 taken under a scanning electron microscope, a surface area that is not smooth. As is apparent from comparison of this surface area with that of uncoated Black Iron Oxide, shown in FIG. 3, they differ greatly from each other with respect to the surface area that is exposed to the surrounding atmosphere.

What is claimed is:

1. An inorganic oxide powder for use as a pigment, comprising:
    (a) a plurality of iron oxide particles;
    (b) a plurality of aluminum oxide particles;
    (c) a plurality of magnesium sulfate particles;
    (d) the aluminum oxide particles and the magnesium sulfate particles forming a coating by mixing together;
    (e) the coating surrounding the iron oxide particles thereby reducing contact between the iron oxide particles and an oxidizing environment;
    (f) the inorganic oxide powder comprises about 99.13% iron oxide particles by weight;
    (g) the inorganic oxide powder comprises 0.67% aluminum oxide particles by weight;
    (h) the inorganic oxide powder comprises about 0.20% magnesium sulfate particles by weight.

2. The inorganic oxide powder of claim 1 consisting only of:
    (a) the inorganic oxide powder having 99.13% iron oxide particles by weight;
    (b) the inorganic oxide powder having 0.67% aluminum oxide particles by weight;
    (c) the inorganic oxide powder having 0.20% magnesium sulfate particles by weight.

* * * * *